United States Patent
Cecil

(10) Patent No.: US 11,524,772 B1
(45) Date of Patent: Dec. 13, 2022

(54) EMERGENCY FLOTATION SYSTEM (EFS)

(71) Applicant: OVER, LLC, Durant, OK (US)

(72) Inventor: William O. Cecil, Durant, OK (US)

(*) Notice: Subject to any disclaimer, the term of this patent is extended or adjusted under 35 U.S.C. 154(b) by 325 days.

(21) Appl. No.: 16/855,764

(22) Filed: Apr. 22, 2020

Related U.S. Application Data

(60) Provisional application No. 62/836,964, filed on Apr. 22, 2019.

(51) Int. Cl.
*B64C 25/56* (2006.01)
*B64D 25/00* (2006.01)
*B64C 39/02* (2006.01)

(52) U.S. Cl.
CPC ............ *B64C 25/56* (2013.01); *B64C 39/024* (2013.01); *B64D 25/00* (2013.01); *B64C 2201/027* (2013.01); *B64C 2201/18* (2013.01)

(58) Field of Classification Search
CPC ....................................................... B64C 25/56
See application file for complete search history.

(56) References Cited

U.S. PATENT DOCUMENTS

| | | | | |
|---|---|---|---|---|
| 1,818,597 A | * | 8/1931 | Adams | B64C 25/56 244/107 |
| 3,091,782 A | * | 6/1963 | Sclafani | B64C 25/52 244/101 |
| 4,382,567 A | * | 5/1983 | Fredericks | B64C 25/56 244/107 |
| 4,655,415 A | * | 4/1987 | Miller | B64C 25/56 244/105 |
| 7,309,267 B1 | * | 12/2007 | Henry | B64C 25/56 441/40 |
| 2003/0060101 A1 | * | 3/2003 | Parrott | B64D 25/18 441/40 |
| 2011/0049294 A1 | * | 3/2011 | Morley | F42B 3/04 102/530 |
| 2011/0276232 A1 | * | 11/2011 | Filias | B64C 25/56 701/45 |
| 2014/0319265 A1 | * | 10/2014 | Cacciaguerra | B64C 27/22 244/6 |
| 2017/0327208 A1 | * | 11/2017 | Delorme | B64C 25/56 |
| 2018/0057153 A1 | * | 3/2018 | Rappl | B64C 25/56 |
| 2019/0202570 A1 | * | 7/2019 | Smith | B64C 25/56 |
| 2021/0237868 A1 | * | 8/2021 | Yamato | B64D 27/24 |

FOREIGN PATENT DOCUMENTS

CN 107719666 A * 2/2018 ............. B64C 25/56

* cited by examiner

*Primary Examiner* — Richard G Davis
(74) *Attorney, Agent, or Firm* — Papalas PLLC

(57) ABSTRACT

Apparatus and associated methodology contemplating an emergency flotation system for floating a flying machine on a body of water. The system includes a water sensor mounted to the flying machine. An inflation device is configured to produce an appropriate amount of pressurized gas in response to the water sensor detecting a presence of water. An inflatable flotation device is in fluid communication with the inflation device, to receive the pressurized gas and thereby become inflated. The flotation device is configured, when inflated, to impart a buoyant force to the flying machine in the water.

20 Claims, 12 Drawing Sheets

EMERGENCY FLOTATION SYSTEM (EFS)

RELATED APPLICATION

This application claims the benefit of the earlier filing date of U.S. Provisional Patent Application Ser. No. 62/836,964 filed on Apr. 22, 2019 and entitled EMERGENCY FLOTATION SYSTEM (EFS).

BACKGROUND

For decades, humans have longed for the day when we can easily, quickly and safely travel through the air in large vertical-take-off-and-landing (VTOL) Aerial Vehicles (AVs), as envisioned in multiple books, movies, cartoons, etc. Recent technological developments have made this dream possible—now. However, to make VTOL AVs a reality in our everyday lives, improvements are needed to establish new and improved Autonomous Transportation Systems (ATS) fostering standardization in the manufacture and operation of large VTOL AVs. These improvements should enable and ensure safe and reliable VTOL aerial travel, now and into the future. It is envisioned that the claimed EFS technology would be incorporated into the design and manufacture of future large size VTOL AVs, specifically the OVER LLC concept AVs, and perhaps other manufacturers' AVs as well.

The ATS and large AVs will provide fully autonomous, point-to-point, GPS-based aerial transportation to/from multiple parking garages, as well as multiple landing areas (such as load/unload locations like driveways, parking lots, etc.). It is envisioned that the new ATS and AVs will provide a safe and reliable alternative, primarily to ground-based vehicles traveling short distances (such as less than 100 miles). Primary applications (market segments) of the ATS and AVs would be light- to medium-weight cargo deliveries, and suburban commuters who drive ground-based vehicles to/from urban spaces. These segments of the transportation market contribute significantly to the problems of congested roadways, slow travel speeds, and generate much of the carbon-based emissions/pollutants generated by ground-based vehicles. If properly designed and implemented, the new ATS and AVs will reduce cargo delivery and commuter travel time, reduce ground-based vehicle traffic and congestion, reduce wear and tear on roadways and infrastructure, reduce harmful emissions/pollution, and provide ease-of-use and convenience to customers. Implementation and operation of the new ATS and AVs will have no detrimental effect on existing traditional aircraft and ground-based vehicles/systems. Over time, it is envisioned that the new ATS and AVs will prove to be the safest and most reliable form of transportation in the history of humankind.

Further, it is envisioned that the new ATS and AVs will provide a safe and reliable alternative to conventional aerial transportation, for short-distance applications (such as less than 100 miles). Conventional fixed-wing aircraft must take off and land only at airports. This constraint requires customers to travel to/from the airport, transport luggage long distances within airports, stand in long security lines, stand in long boarding lines, etc. These constraints make conventional commercial aircraft travel difficult, inconvenient and time consuming for customers. The new ATS and AVs will provide customers with an easier to use, more convenient and time-saving transportation system, as compared to traditional airport systems. Implementation and operation of the new ATS and AVs will have no detrimental effect on existing conventional aircraft operations, but will accommodate their integration into the new ATS, when/if the Federal Aviation Administration (FAA) deems it appropriate.

Although there are currently only a small number of operational large VTOL multi-copter AVs worldwide that can carry 50 kg (110 lbs) or more of payload (such as Ehang 184, Volocopter VC200, Boeing prototype, etc.), many companies throughout the world are currently developing and testing various designs and prototypes. For example, Boeing has developed an electric, unmanned VTOL multi-copter AV prototype designed to carry up to 225 kg (500 lbs). Many of these prototype and operational AVs are similar in design to small quad-copter/multi-engine Drones currently used in various industries and applications. However, a universal goal of many companies is to develop significantly larger and more powerful AVs, to carry larger payloads, as well as increase flight speed and duration. Although designs and prototypes vary, the inherent flight characteristics/capabilities of virtually all VTOL, multi-engine AVs provide a safer and more stable aerial platform than any conventional aircraft in use today, as well as improved customer convenience. It is anticipated that these and other large VTOL AVs will continue to be designed, manufactured and placed into operation worldwide. This inevitable fact necessitates improvements in support of a new, standardized ATS which ensures safe, secure, reliable and swift operations, regardless of manufacture. The claimed EFS technology contributes to making VTOL AV operations safe and reliable, for both passengers and cargo.

It is possible that the U.S. government might eventually lead the way in approving and implementing a new ATS, which will use standardized VTOL multi-engine AVs, which will provide convenience and ease-of-use to customers, in both cargo and human passenger applications. It is anticipated that all large AVs approved for use within the new ATS (regardless of manufacturer) will contain various reliable, redundant and standardized systems and components to ensure safe and reliable travel (such as communication, networking, flight control, collision avoidance, etc.). Further, it is anticipated that many parking garages which accommodate loading and unloading of passengers, and many approved Passenger Aerial Vehicles (PAVs) will accommodate wheelchairs, in accordance with the most current Americans with Disabilities Act (ADA) requirements.

It is anticipated that the approved, large, standardized AVs will contain high-quality, reliable, redundant systems and components that will minimize (virtually eliminate) the risk of crash, and subsequent injury or death of passengers, damage to cargo, or damage to people or property on the ground. Since the impact of system or component failure could result in injury or death, it is anticipated that manufacturers will continuously/perpetually analyze and manage all risks, and take appropriate actions to reduce the probability of occurrence of each risk to (virtually) zero.

The claimed EFS technology is a significant improvement over current flotation systems used on traditional helicopters. One example is the Safran Aerosystems' emergency flotation system (https://www.safran-aerosystems.com/safety-systems/floats-rafts-0) comprised of large, static "floats" which do not inflate, but are rather permanently attached to the lower part of the helicopter cabin. If the helicopter has to land in water, the floats are designed to keep the aircraft stable and afloat long enough for passengers and crew to be evacuated. Although the floats reduce the risks of capsize and submersion, the bulky static floats increase drag, and thereby reduce efficiency and fuel economy. The claimed EFS technology, specifically each airbag assembly, in these illustrative embodiments is contained within the lower part of the motor/landing leg assembly (when not inflated) and therefore has very little effect on drag, efficiency or fuel economy, and is esthetically more appealing. Further, when all airbags are inflated around all four motor/landing legs of an AV, the claimed EFS technology provides a more stable configuration than traditional floats, and provides a lower probability of capsizing or submersion, thereby reducing the risks to passengers, cargo, and the AV itself.

The small-size EFS embodiments are designed to provide emergency flotation for Drones. The uninflated airbag assemblies in these illustrative embodiments are contained within the hollow tubes of the landing legs, which provides an Original Equipment Manufacturer (OEM) appearance. Their OEM-type shape and size will have very little effect on drag, efficiency or battery power consumption. It's envisioned that the claimed technology would be offered by OEM's as an optional, add-on feature when manufactured, and provided as an aftermarket remove/replace accessory as well. There are two illustrative designs for Drone leg assemblies, the upside down "T" style illustrated in FIG. 7a, and the straight vertical style illustrated in FIG. 9a. Although the illustrative embodiments of the claimed technology are presented here, in both the upside down "T" and straight vertical styles, other embodiments may have a different shape, size and/or mounting brackets, so to provide a simple remove and replace aftermarket capability for other manufactured Drone leg assembly styles. As with the large AV EFS embodiments, when water covers the exterior clear surface of a water sensor, the infrared light is deflected/changed, causing the sensor contacts to switch (such as from normally open to closed) to allow direct current (DC) voltage, such as 12 VDC, to activate its inflator. In some illustrative embodiments, the inflation of each airbag assembly is independent of all other airbag assemblies. Alternately, other embodiments can synchronize the inflation of all airbag assemblies if one or more assemblies are activated. The claimed small-size EFS technology provides a stable configuration which lowers the probability of the Drone submersing, thereby reducing the risks of damage or loss of payload, cargo, or the Drone itself.

It is to those improvements that embodiments of the present technology are directed.

SUMMARY

Some embodiments of this technology contemplate an emergency flotation system for floating a flying machine on a body of water. The system includes a water sensor mounted to the flying machine. An inflation device is configured to produce a desired supply of pressurized gas in response to the water sensor detecting a presence of water. An inflatable flotation device is in fluid communication with the inflation device, to receive the pressurized gas and thereby become inflated. The flotation device is configured, when inflated, to impart a buoyant force to the flying machine in the water.

BRIEF DESCRIPTION OF THE DRAWINGS

Two primary embodiments of the claimed EFS technology are illustrated as examples, namely the large AV version (FIGS. 1-6), and the small Drone version (FIGS. 7-11) and an operational flow diagram for both (FIG. 12). The claimed EFS technology is not limited by the figures of the accompanying drawings, in which like references may indicate similar elements and in which:

DETAILED DESCRIPTION

Figure 1:
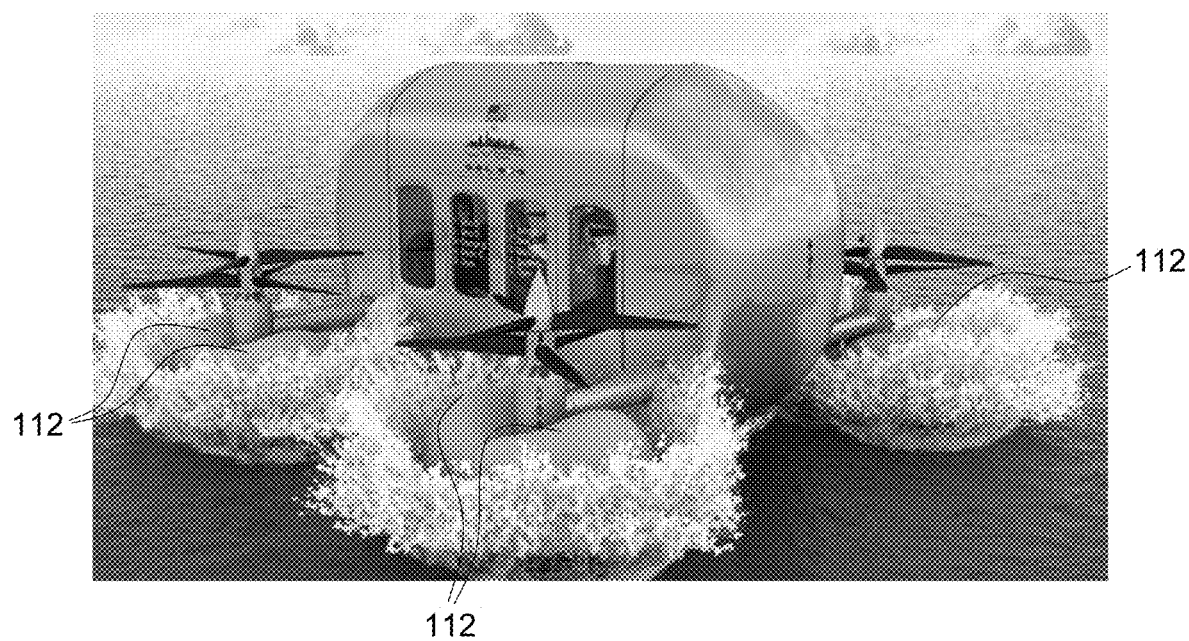
FIG. 1 is a digital rendering of a perspective view of a large Aerial Vehicle (AV) making an emergency landing in water, containing elements that may comprise an activated EFS, specifically eight inflated airbags [112], of which only five are in view.

Initially, this disclosure is by way of example only, not by limitation. The illustrative constructions and associated methods disclosed herein are not limited to use or application for any specific system or in any specific environment. That is, the disclosed technology is not limited to application as incorporated in an Aerial Vehicle (AV) or a Drone as is disclosed in the illustrative embodiments. Alternatively, the skilled artisan will recognize that the principles set forth in the illustrative embodiments of this disclosure can alternatively be employed in other types of machines that work in and around bodies of water. Thus, although the instrumentalities described herein are for the convenience of explanation, shown and described with respect to exemplary embodiments, the skilled artisan understands that the operating principles for floating a machine in a body of water as set forth herein may be applied equally in other types of systems and environments. The skilled artisan does not need a complete enumeration of all types of such alternative situations to understand the scope of the claimed subject matter, so no such enumeration is attempted.

The terminology used herein is for the purpose of describing particular embodiments only and is not intended to be limiting of the claimed technology. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, assemblies, elements, components, and/or parts, but do not preclude the presence or addition of one or more other features, steps, operations, assemblies, elements, components, parts, and/or groups thereof.

Unless otherwise defined, all terms (including technical and scientific terms) used herein have the same meaning as commonly understood by one having ordinary skill in the art to which this claimed technology belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In describing the claimed technology, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the claimed technology and the claims.

New devices, apparatuses, and methods to provide emergency flotation for large VTOL AVs and small Drones are discussed herein. In the following description, for purpose of explanation, numerous specific details are set forth in order to provide a thorough understanding of the claimed technology. It will be evident, however, to one skilled in the art that the claimed technology may be practiced without these specific details.

In describing the claimed technology, the words "automatic" and/or "automatically" are used multiple times. As used herein, words "automatic" and/or "automatically" refer to actions/operations performed by the claimed technology as a result of the EFS components and AV software program commands, without human input or action. For example, the actions of closing the water sensor switch contacts, activating the inflator, and inflating the airbag are all described as "automatic".

In describing the claimed technology, the words "autonomous" and/or "autonomously" are used multiple times. As used herein, words "autonomous" and/or "autonomously" refer to self-controlled actions/operations performed internally by the AV and/or claimed technology, without human interaction or assistance or other external control. For example, the actions of closing the water sensor switch contacts, activating the inflator, and inflating the airbag are all described as "autonomous."

The claimed EFS technology will now be described by referencing the appended figures representing illustrative embodiments. The present disclosure is to be considered as an exemplification of the claimed technology and is not intended to limit the claimed technology to the specific embodiments illustrated by the figures or description below.

FIG. 1 is a digital rendering of a perspective view of a large Aerial Vehicle (AV) making an emergency landing in water, containing elements that may comprise an activated EFS, specifically eight inflated airbags [112], of which only five are in view. The digital rendering illustrates a moment in time when water has contacted one or more water sensors due to the landing in water, causing the water sensor(s) to switch their contacts allowing an onboard source of DC voltage (such as 12 VDC) to activate associated inflators, which have inflated the airbags. Three of the eight inflated airbags are hidden from view in FIG. 1.

Figure 2:
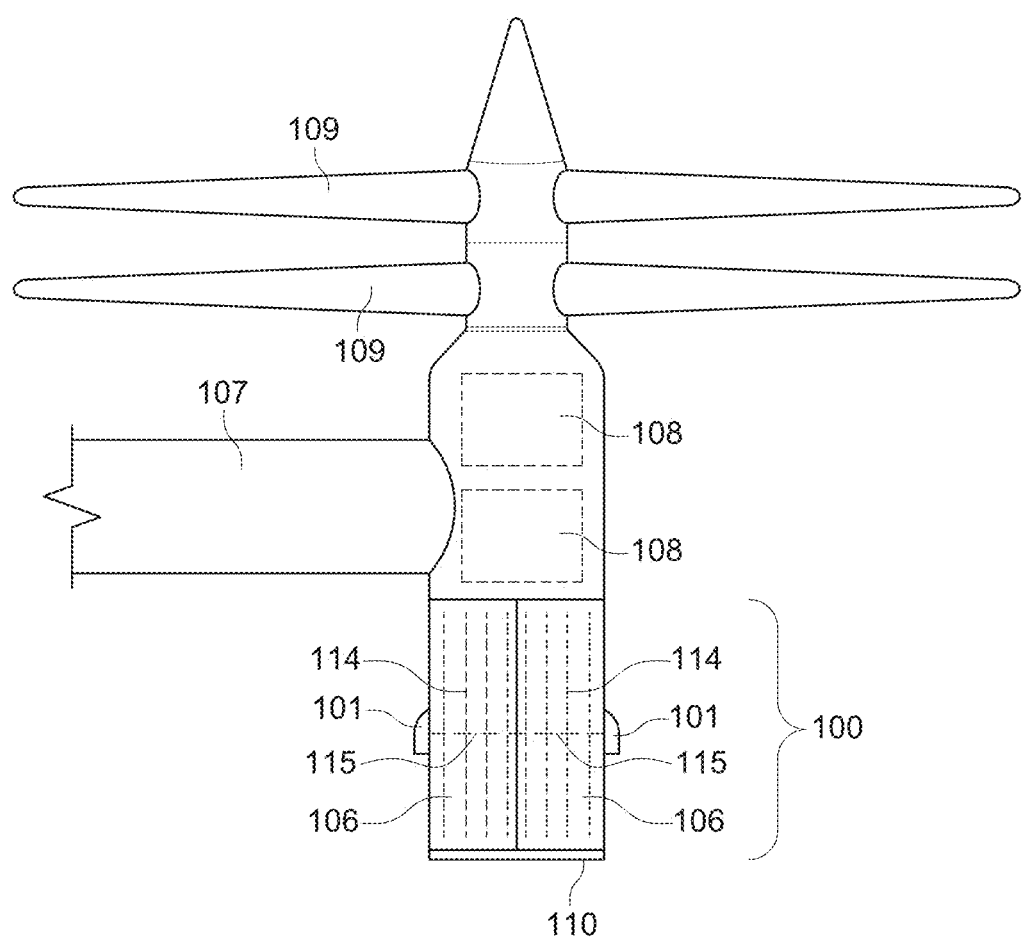
FIG. 2 depicts an elevational view of the placement of the motor/landing arm [107], two propellers [109], two electric motors [108], the landing foot [110], and a landing leg [100] containing some elements that may comprise an un-activated large-size EFS, specifically two water sensor covers [101], two covers with perforated strips before inflation [106], vertical perforations [114], and horizontal perforations [115] according to various embodiments of the claimed technology.

FIG. 2 depicts an elevational view of the placement of the motor/landing arm [107], two propellers [109], two electric motors [108], the landing foot [110], and a landing leg [100] containing some elements that may comprise an un-activated large-size EFS, specifically two water sensor covers [101], two covers with perforated strips before inflation [106], vertical perforations [114], and horizontal perforations [115] according to various embodiments of the claimed technology. The thin-walled covers [106] can be approximately $\frac{1}{8}^{th}$ inch thick, and made of durable, lightweight materials. The covers [106] contain vertical perforations [114] that form strips in the covers, approximately 2 inches wide, and horizontal perforations [115] around the circumference, about halfway up the landing leg, resulting in 6-inch long strips. When the airbags inflate, the pressure tears the covers along the vertical perforations [114] and horizontal perforations [115], to form strips approximately 2 inches wide and six (6) inches long, both above and below the inflated airbag. There are no perforations along the top or bottom of the landing leg covers, which ensures that the strips remain attached to the landing leg after the airbag has inflated.

Figure 3:
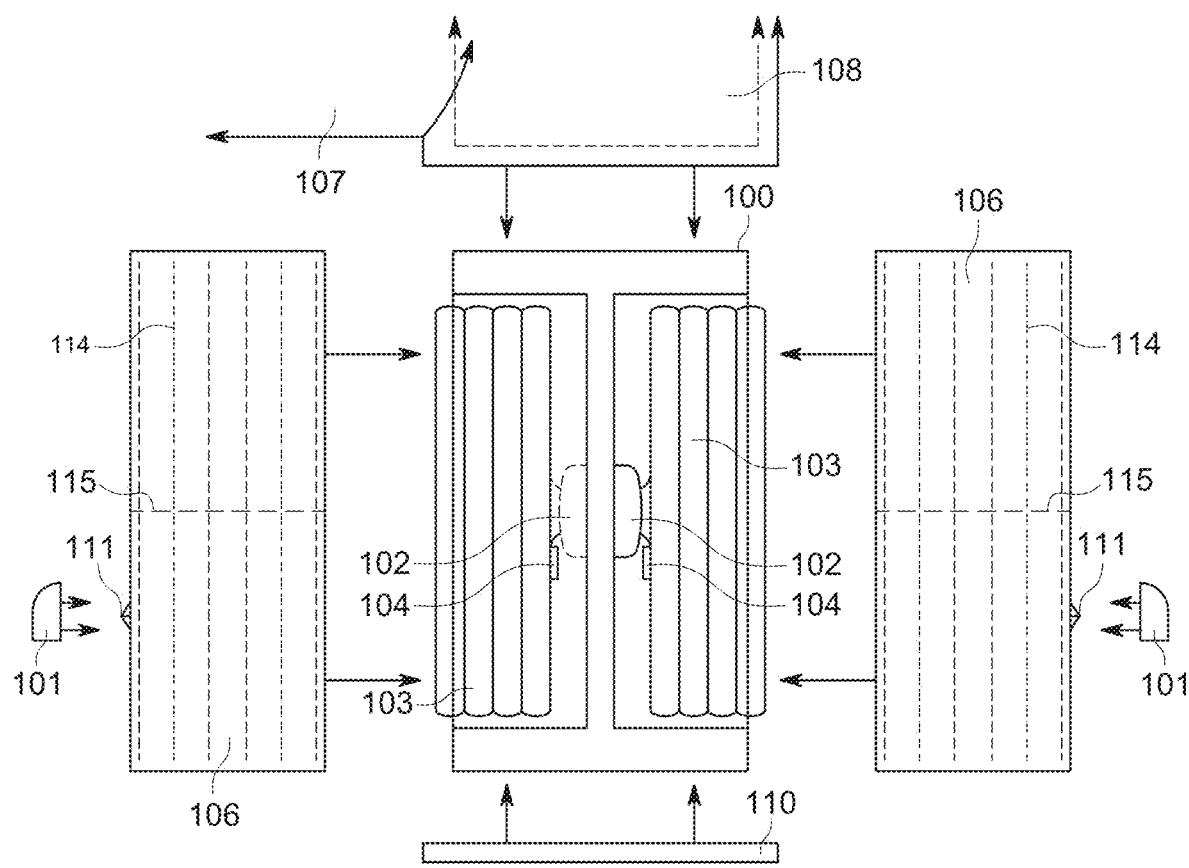
FIG. 3 depicts an exploded elevational view of the placement of the motor/landing arm [107], the lower electric motor [108], the landing foot [110], and a landing leg [100] containing some elements that may comprise an un-activated large-size EFS, specifically two water sensor covers [101], two inflators [102], two folded airbags [103], two pressure relief valves [104], two water sensors [111], two covers with perforated strips before inflation [106], vertical perforations [114], and horizontal perforations [115] according to various embodiments of the claimed technology.

FIG. 3 depicts an exploded elevational view of the placement of the motor/landing arm [107], the lower electric motor [108], the landing foot [110], and a landing leg [100] containing some elements that may comprise an un-activated large-size EFS, specifically two water sensors [111], two water sensor covers [101], two inflators [102], two folded airbags [103], two pressure relief valves [104], two covers with perforated strips before inflation [106], vertical perforations [114], and horizontal perforations [115] according to various embodiments of the claimed technology. The landing leg [100] frame provides support for the AV when landing and parked on the ground, and has a +(plus) shape when viewed from the top down (see FIG. 4). One inflator [102] is visible but the other (in dashed lines) is behind the landing leg frame and is not actually visible, but is depicted in dashed lines for clarity. The water sensor covers [101] protect the water sensors from precipitation, but have open bottoms to allow water to reach the sensor [111] if the landing leg enters water or if flood waters rise.

Figure 4:
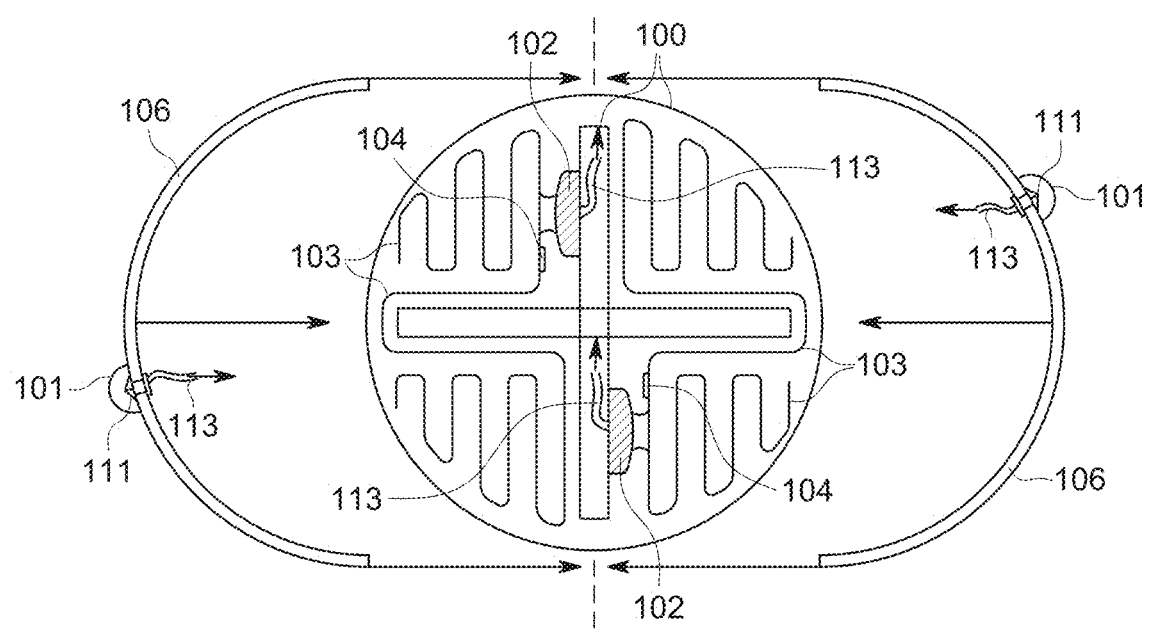
FIG. 4 depicts an exploded cross-sectional top-down view of a landing leg [100] containing some elements that may comprise an un-activated large-size EFS, specifically two water sensor covers [101], two inflators [102], two folded airbags [103], two pressure relief valves [104], two covers with perforated strips before inflation [106], two water sensors [111], and low-voltage electric wiring [113], according to various embodiments of the claimed technology.

FIG. 4 depicts an exploded cross-sectional top-down view of a landing leg [100] containing some elements that may comprise an un-activated large-size EFS, specifically two water sensor covers [101], two inflators [102], two folded airbags [103], two pressure relief valves [104], two covers with perforated strips before inflation [106], two water sensors [111], and low-voltage electric wiring [113], according to various embodiments of the claimed technology. The left inflator and the left water sensor are wired together (see FIG. 6) to comprise one independent airbag assembly, and similarly the right inflator and the right water sensor are wired together to comprise a second independent airbag assembly. Each landing leg contains two independent airbag assemblies, each capable of activation via its own water sensor. The low-voltage electrical wiring has two copper conductors, approximately 22-guage, and covered in a flame-retardant PVC insulation.

Figure 5A:
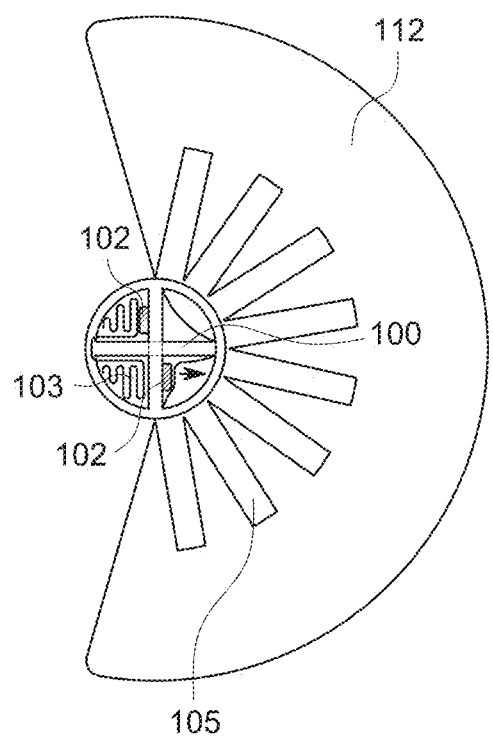
FIG. 5a depicts a cross-sectional top-down view of a landing leg [100] containing some elements that may comprise an activated large-size EFS where one airbag assembly is activated and one is un-activated (for whatever reason), specifically one inflated airbag [112], one uninflated folded airbag [103], two inflators [102] one activated and one un-activated, and multiple perforated strips after inflation [105] shown torn apart by the inflation of the one airbag, according to various embodiments of the claimed technology.

FIG. 5a depicts a cross-sectional top-down view of a landing leg [100] containing some elements that may comprise an activated large-size EFS where one airbag assembly was activated, and one was not activated (for whatever reason). This is non-typical. Specifically, FIG. 5a depicts one inflated airbag [112], one uninflated folded airbag [103], one activated and one un-activated inflator [102], and multiple perforated strips after inflation [105] shown torn apart by the instantaneous inflation of the one airbag, according to various embodiments of the claimed technology. There are approximately 8 strips above the airbag (in view) and 8 strips below the airbag (not in view), for an approximate total of 16 strips, all being approximately six (6) inches×2 inches, and all still attached to the landing leg cover [106] at the non-perforated ends. In some illustrative embodiments, each airbag forms a semi-toroid spanning an included angle of approximately 200-degrees, slightly larger than a 180-degree half donut shape.

Figure 5B:
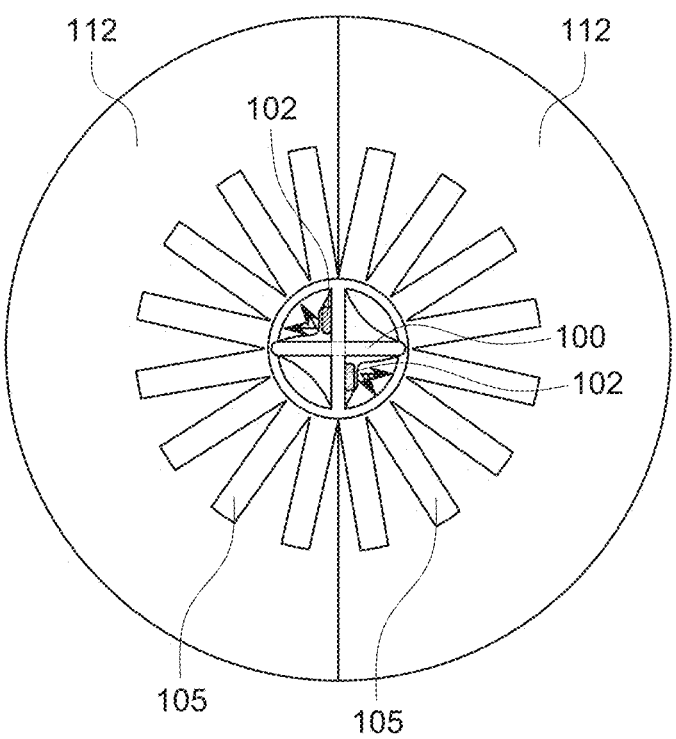
FIG. 5b depicts a cross-sectional top-down view of a landing leg [100] containing some elements that may comprise an activated large-size EFS where both airbag assemblies are activated, specifically two inflated airbags [112], two activated inflators [102], and multiple perforated strips after inflation [105] shown torn apart by the inflation of the two airbags, according to various embodiments of the claimed technology.

FIG. 5b depicts a cross-sectional top-down view of a landing leg [100] containing some elements that may comprise an activated large-size EFS where both airbag assemblies are activated, which is typical. Specifically, FIG. 5b depicts two inflated airbags [112], two activated inflators [102], and multiple perforated strips after inflation [105] shown torn apart by the instantaneous inflation of the two airbags, according to various embodiments of the claimed technology. There are approximately 16 strips above the airbags (in view) and 16 strips below the airbags (not in view), for an approximate total of 32 strips, all being approximately six (6) inches×2 inches, and all still attached to their landing leg cover at the non-perforated ends. In some illustrative embodiments, each airbag is approximately 200-degrees from side to side, slightly larger than a 180-degree half donut shape, so when inflated the sides press together to provide a firm, round donut-shape.

Figure 6:
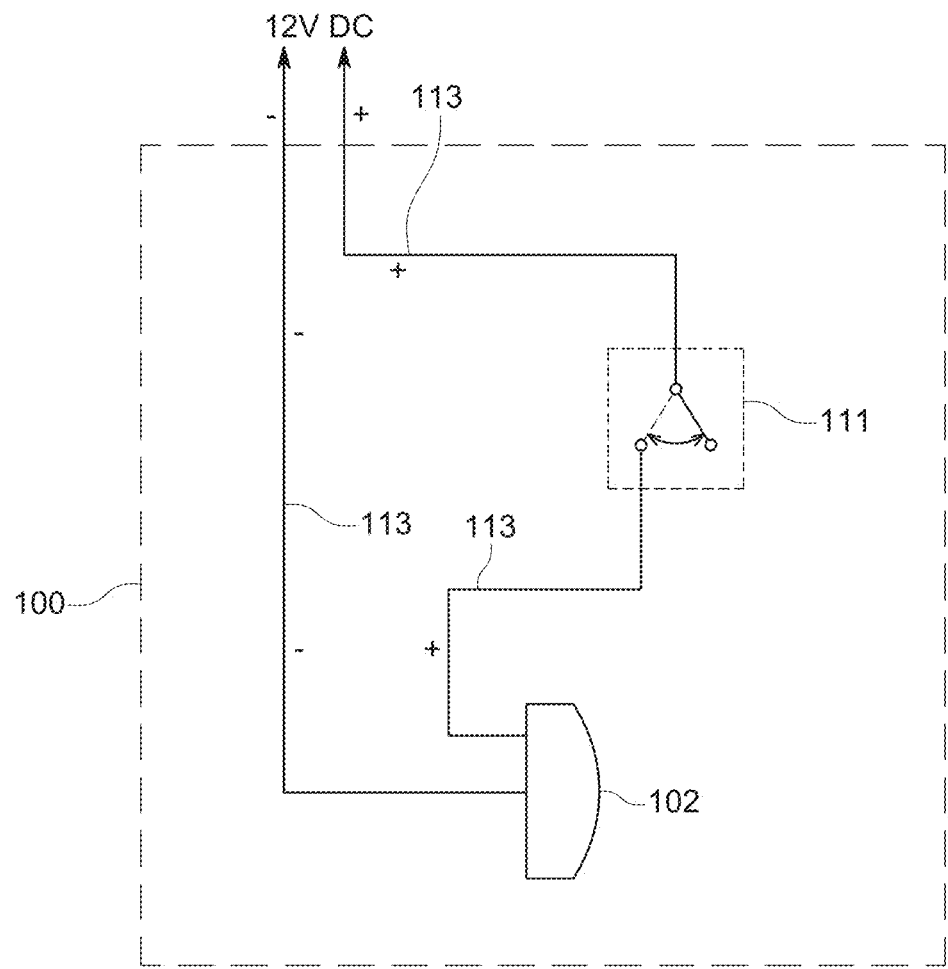
FIG. 6 depicts an electrical block diagram containing some elements that may comprise an un-activated large-size EFS, specifically a single uninflated airbag assembly contained within a landing leg [100], specifically an inflator [102], a water sensor [111], and low-voltage electric wiring [113], according to various embodiments of the claimed technology.

FIG. 6 depicts an electrical block diagram containing some elements that may comprise an un-activated large-size EFS, specifically a single uninflated airbag contained within a landing leg assembly [100], an inflator [102], a water sensor [111], and low-voltage electric wiring [113], according to various embodiments of the claimed technology. In some illustrative embodiments, DC voltage (such as 12 VDC) is provided by the AV's power supply, and the positive (+) is applied to the common side of the water sensor. When the water sensor detects water, it automatically and autonomously closes its switch contacts to allow voltage to activate the inflator within its airbag assembly, independent of all other airbag assemblies. Once activated, the inflator produces an appropriate amount of gas, such as nitrogen in these illustrative embodiments, which inflates the airbag (not shown) within about 30 milliseconds.

Figure 7A:
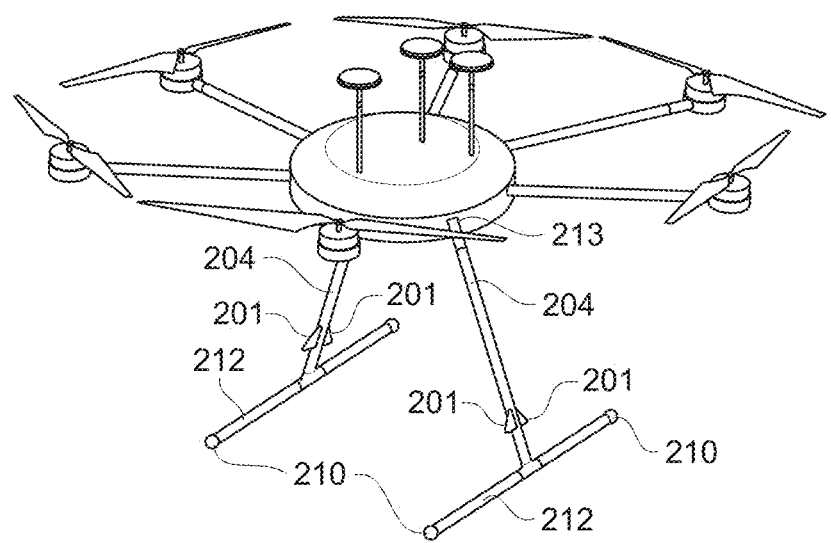
FIG. 7a depicts a perspective view of a Drone having two upside down "T" shaped landing legs containing some elements that may comprise an un-activated small-size EFS, specifically four water sensor covers [201], two vertical landing legs [204], four separable landing feet [210] designed to pop off when their associated airbag deploys, and two horizontal landing legs [212], according to various embodiments of the claimed technology.

FIG. 7a depicts a perspective view of a DJI Matrice 600 Pro Hexacopter Drone (as an example) having two upside down "T" shaped landing leg assemblies containing some elements that may comprise an un-activated small-size EFS, specifically four water sensor covers [201], two vertical landing legs [204], four separable landing feet [210] designed to pop off when their associated airbag deploys, and two horizontal landing legs [212], according to various embodiments of the claimed technology. The illustration shows the Drone in its normal operating configuration, where the water sensors have open contacts and no DC voltage (such as 12 VDC) is applied to the inflators, and as a result the airbags are uninflated.

Figure 7B:
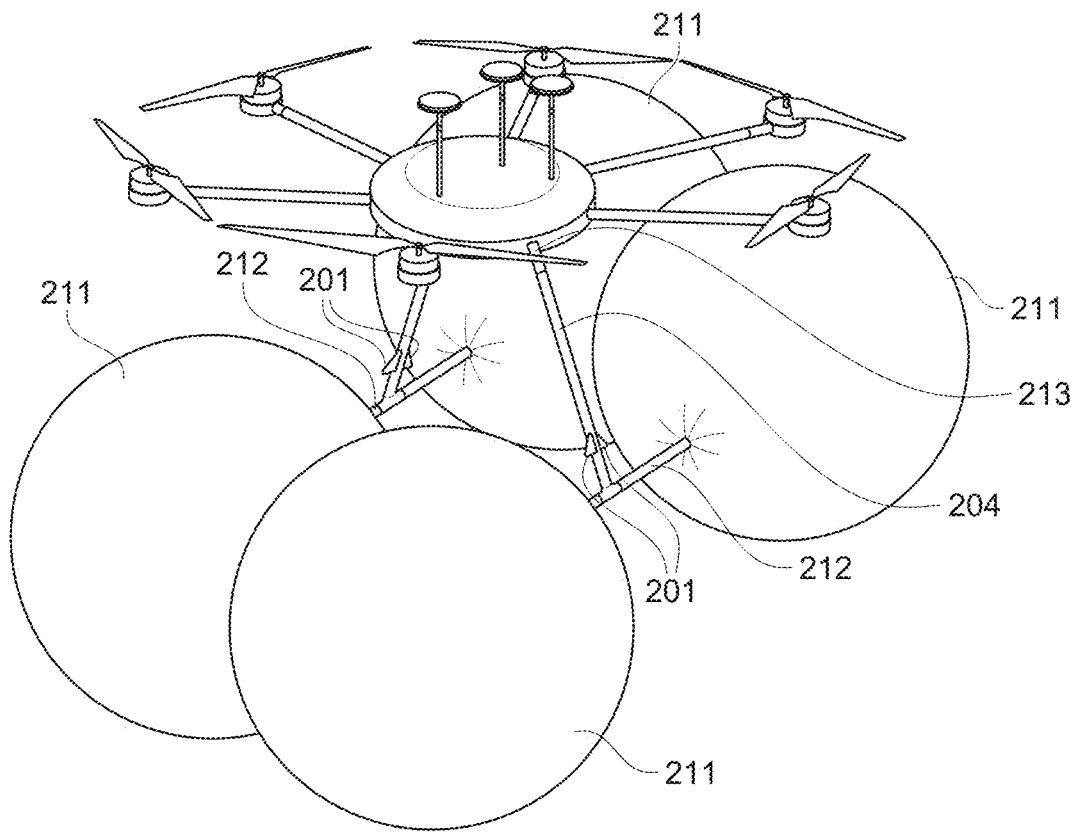
FIG. 7b depicts a perspective view of the placement of various components within a Drone landing leg assembly, specifically a Drone having two upside down "T" shaped landing legs containing some elements that may comprise an activated small-size EFS, specifically four water sensor covers [201], two vertical landing legs [204], four inflated airbags [211], two horizontal landing legs [212], and two landing leg mounting brackets [213] (only one being visible), according to various embodiments of the claimed technology.

FIG. 7b depicts a perspective view of a DJI Matrice 600 Pro Hexacopter Drone (as an example) making an emergency landing in water, (water not shown), containing some elements that may comprise an activated small-size EFS, specifically four water sensor covers [201], two vertical landing legs [204], four inflated airbags [211], two horizontal landing legs [212], and two landing leg mounting brackets [213] (only one being visible), according to various embodiments of the claimed technology. The illustration shows the Drone with all airbags inflated, after water has contacted the four water sensors due to the landing legs entering the water approximately three (3) inches deep, and the water sensors have closed their contacts allowing DC voltage (such as 12 VDC) to activate their four associated inflators, which have inflated all four airbags.

Figure 8:
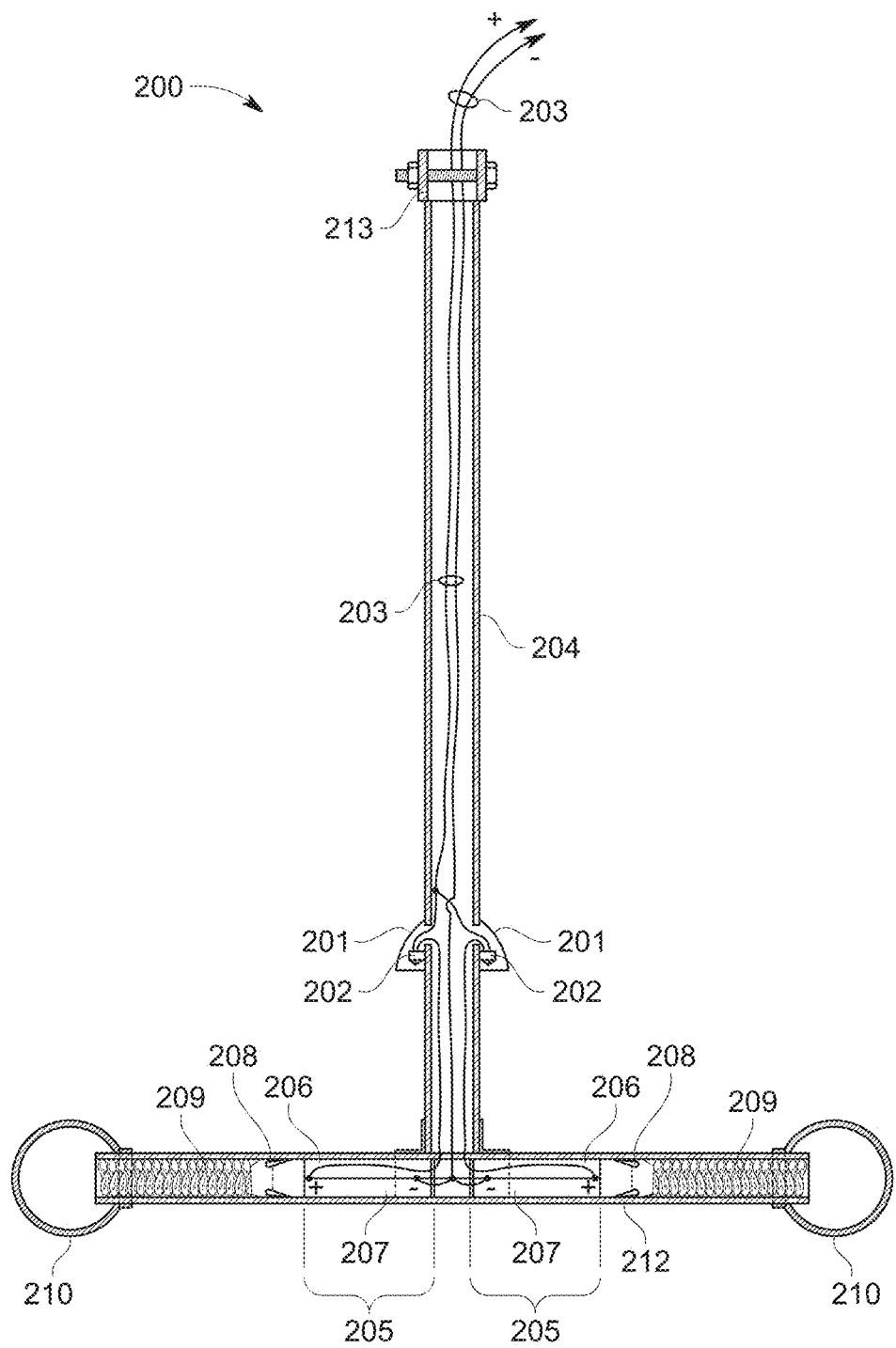
FIG. 8 depicts an elevational front view of the placement of various components within an upside down "T" shaped Drone landing leg assembly, containing some elements that may comprise an un-activated small-size EFS, specifically two water sensor covers [201], two water sensors [202], low-voltage electric wiring [203], one vertical landing leg [204], two inflators [205], two volumes of sodium azide (NaN3) [206], two volumes of potassium nitrate (KNO3) [207], two seal rings for airbag neck [208], two uninflated folded airbags [209], two separable landing feet [210], one horizontal landing leg [212], and one landing leg mounting bracket [213], according to various embodiments of the claimed technology.

FIG. 8 depicts an elevational front view of the placement of various components within an upside down "T" shaped Drone landing leg assembly, containing some elements that may comprise an un-activated small-size EFS, specifically two water sensor covers [201], two water sensors [202], low-voltage electric wiring [203], one vertical landing leg [204], two inflators [205], two volumes of sodium azide (NaN3) [206], two volumes of potassium nitrate (KNO3) [207], two seal rings for airbag neck [208], two uninflated folded airbags [209], two separable landing feet [210], one horizontal landing leg [212], and one landing leg mounting bracket [213], according to various embodiments of the claimed technology. When the airbags inflate, the pressure will push (pop) the two separable landing feet [210] off the ends of the horizontal landing leg tube [212].

Figure 9A:
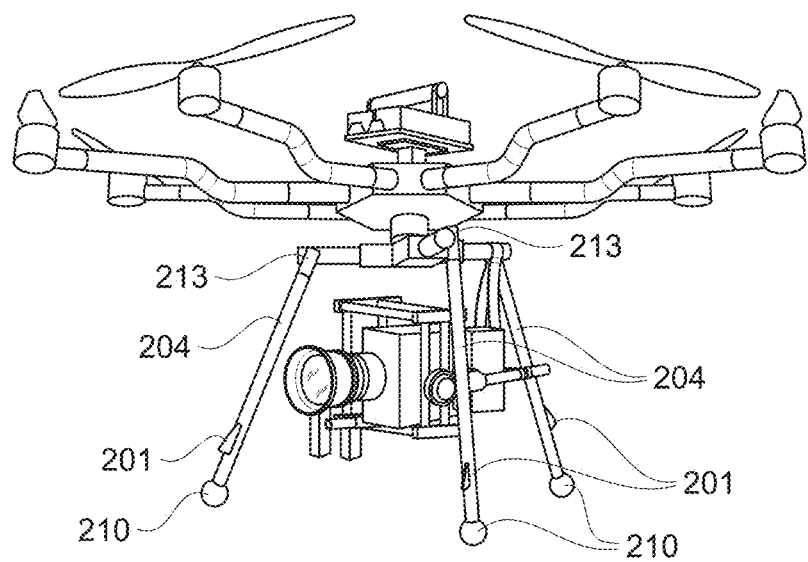
FIG. 9a depicts a perspective view of a Drone having three vertical landing legs containing some elements that may comprise an un-activated small-size EFS, specifically three water sensor covers [201], three vertical landing legs [204], three separable landing feet [210], and three mounting brackets [213] (only two being visible), according to various embodiments of the claimed technology.

FIG. 9a depicts a perspective view of a Freefly Alta 8 Drone (as an example) having three vertical landing leg assemblies containing some elements that may comprise an un-activated small-size EFS, specifically three water sensor covers [201], three vertical landing legs [204], three separable landing feet [210] designed to pop off when their associated airbag deploys, and three mounting brackets [213] (only two being visible), according to various embodiments of the claimed technology. The illustration shows the Drone in its normal operating configuration, where the water sensors have open contacts and no DC voltage (such as 12 VDC) is applied to the inflators, and as a result the airbags are uninflated.

Figure 9B:
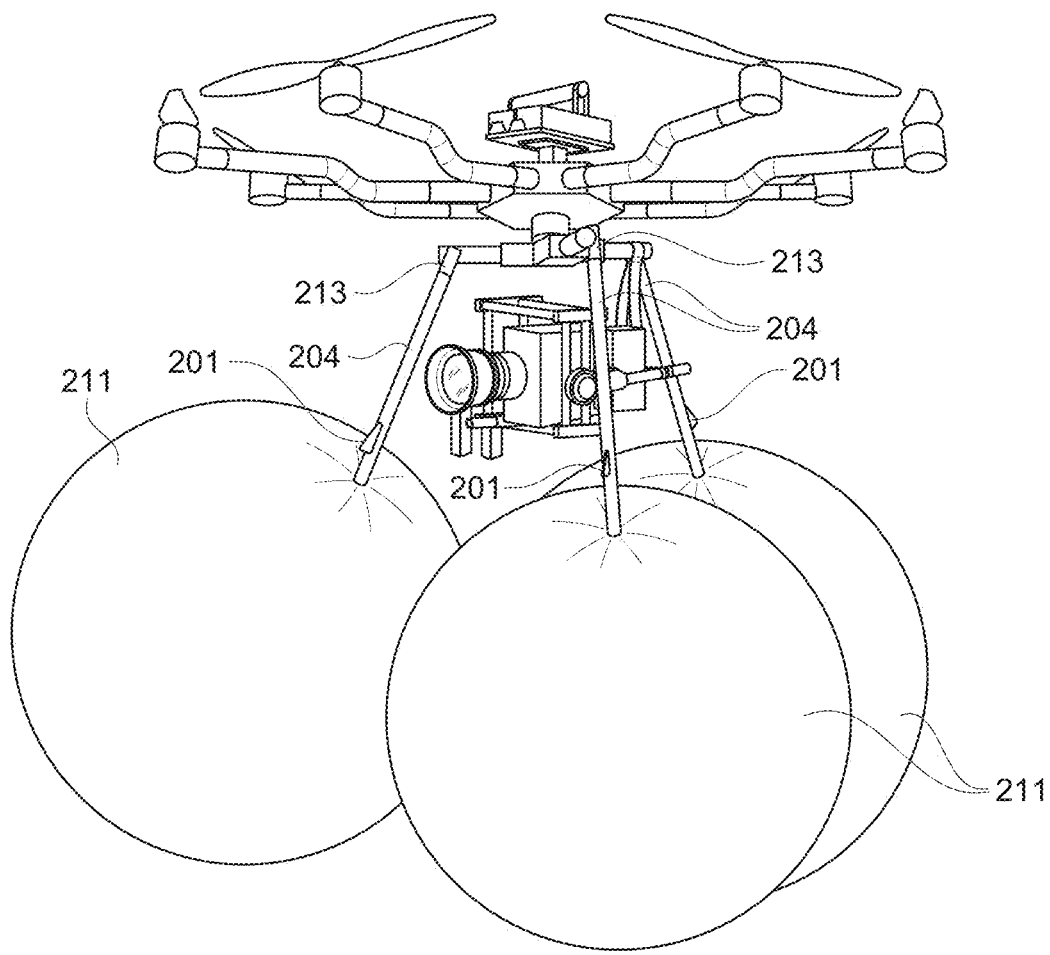
FIG. 9b depicts a perspective view of the placement of various components within a Drone landing leg assembly, specifically a Drone having three vertical landing legs containing some elements that may comprise an activated small-size EFS, specifically three water sensor covers [201], three vertical landing legs [204], three inflated airbags [211], and three mounting brackets [213] (only two being visible), according to various embodiments of the claimed technology.

FIG. 9b depicts a perspective view of a Freefly Alta 8 Drone (as an example) making an emergency landing in water, (water not shown), containing some elements that may comprise an activated small-size EFS, specifically three water sensor covers [201], three vertical landing legs [204], three inflated airbags [211], and three mounting brackets [213] (only two being visible), according to various embodiments of the claimed technology. The illustration shows the Drone with all airbags inflated, after water has contacted the three water sensors due to the landing legs entering the water approximately three (3) inches deep, and the water sensors having closed their contacts allowing DC voltage (such as 12 VDC) to activate their three associated inflators, which have inflated all three airbags.

Figure 10:
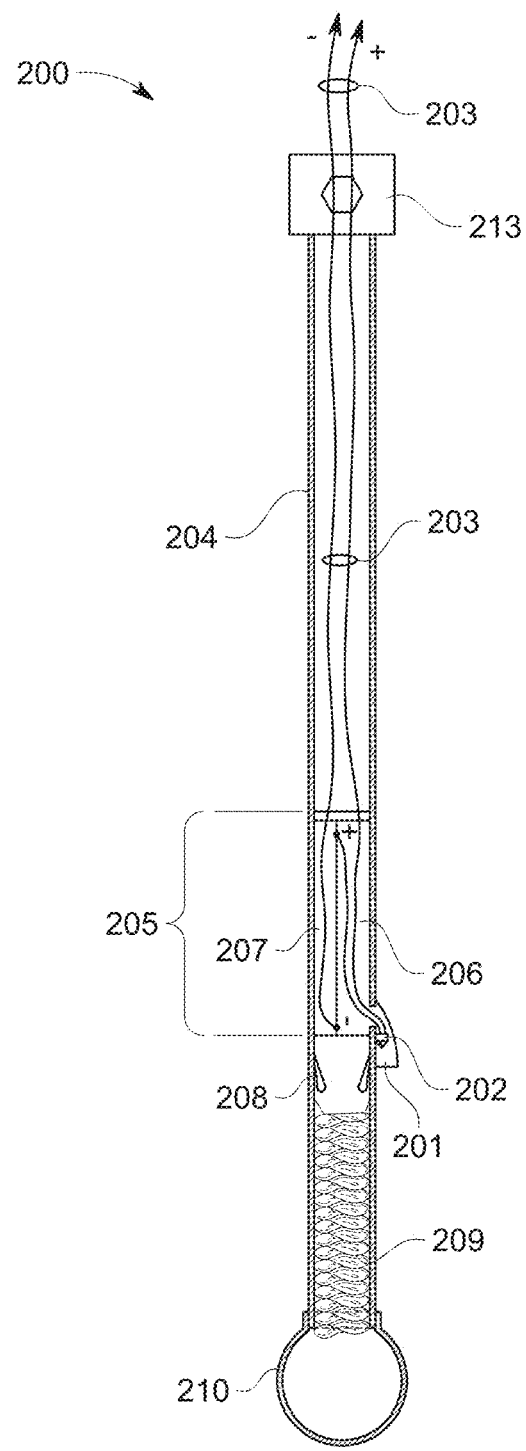
FIG. 10 depicts an elevational side view of the placement of various components within a vertical landing leg assembly, containing some elements that may comprise an un-activated small-size EFS, specifically a water sensor cover [201], a water sensor [202], low-voltage electric wiring [203], a vertical landing leg [204], an inflator [205], a volume of sodium azide (NaN3) [206], a volume of potassium nitrate (KNO3) [207], a seal ring for the airbag neck [208], an uninflated folded airbag [209], a separable landing foot [210], and a landing leg mounting bracket [213], according to various embodiments of the claimed technology.

FIG. 10 depicts an elevational side view of the placement of various components within a vertical landing leg assembly, containing some elements that may comprise an un-activated small-size EFS, specifically a water sensor cover [201], a water sensor [202], low-voltage electric wiring [203], a vertical landing leg [204], an inflator [205], a volume of sodium azide (NaN3) [206], a volume of potassium nitrate (KNO3) [207], a seal ring for the airbag neck [208], an uninflated folded airbag [209], a separable landing foot [210], and a landing leg mounting bracket [213], according to various embodiments of the claimed technology. The water sensor [201] covers protect the water sensors [202] from precipitation, but have open bottoms to allow water to enter if the landing leg enters water or if flood waters rise.

Figure 11A:
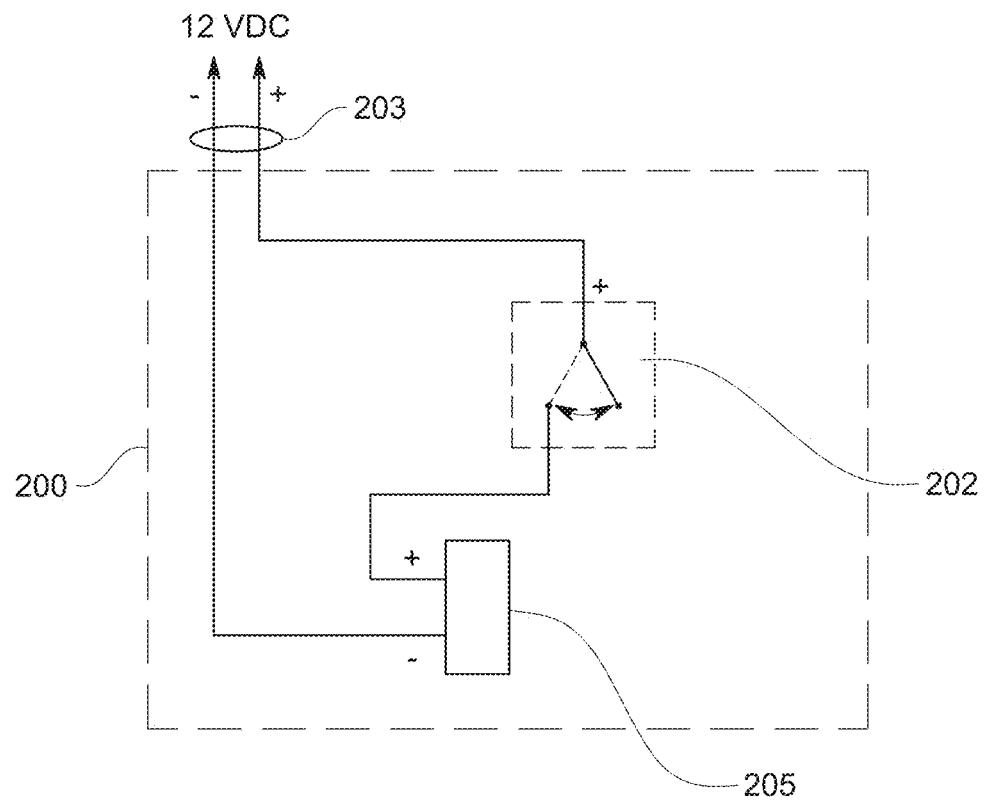
FIG. 11a depicts an electrical block diagram containing some elements that may comprise an un-activated small-size EFS for a Drone having vertical landing legs, specifically a single uninflated airbag assembly contained within a vertical landing leg assembly, specifically a water sensor [202], low-voltage electric wiring [203], and an inflator [205], according to various embodiments of the claimed technology.

FIG. 11a depicts an electrical block diagram containing some elements that may comprise an un-activated small-size EFS for a Drone having vertical landing legs, specifically a single uninflated airbag (not shown) contained within a landing leg assembly, a water sensor [202], low-voltage electric wiring [203], and an inflator [205], according to various embodiments of the claimed technology. In some illustrative embodiments, DC voltage (such as 12 VDC) is provided by the Drone's power supply, and the positive (+) is applied to the common side of the water sensor [202]. In these illustrative embodiments, when the water sensor [202] detects water, it automatically and autonomously closes its switch contacts to allow voltage to activate the inflator, independent of all other airbag assemblies. Once activated, the inflator produces an appropriate amount of nitrogen gas, which inflates the airbag (not shown) within about 30 milliseconds.

Figure 11B:
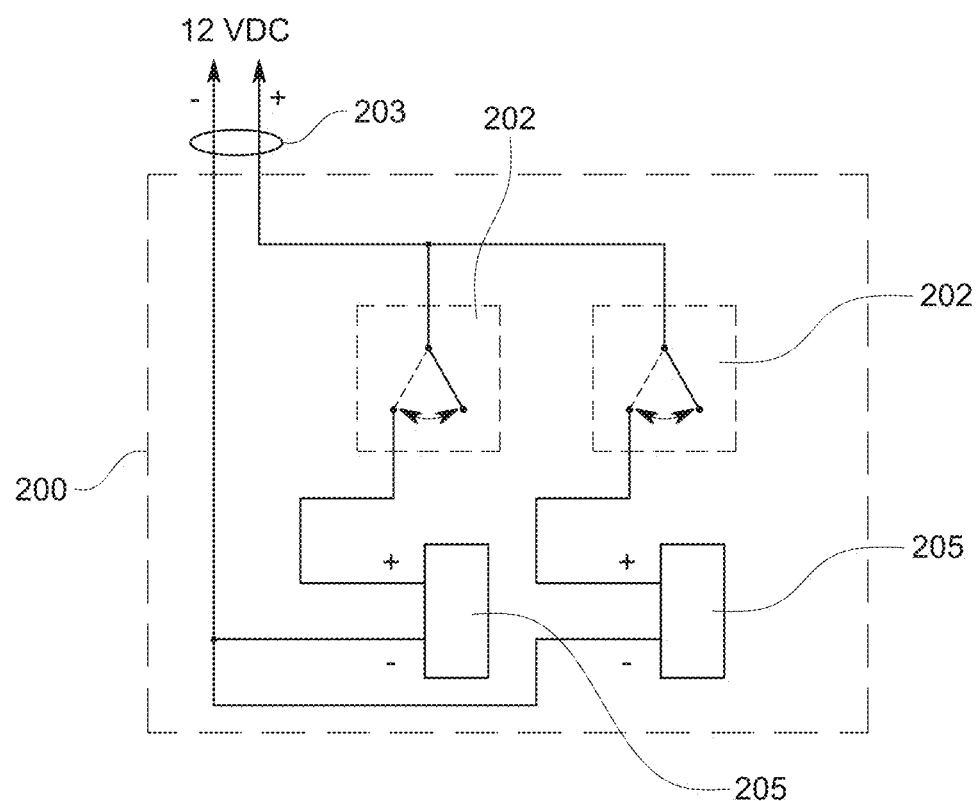
FIG. 11b depicts an electrical block diagram containing some elements that may comprise an un-activated small-size EFS for a Drone having upside down "T" shaped landing legs, specifically two uninflated airbag assemblies contained within an upside down "T" shaped landing leg assembly, specifically two water sensors [202], two low-voltage electric wirings [203], and two inflators [205], according to various embodiments of the claimed technology.

FIG. 11b depicts an electrical block diagram containing some elements that may comprise an un-activated small-size EFS for a Drone having upside down "T" shaped landing legs, specifically two uninflated airbags (not shown) contained within a landing leg assembly, two water sensors [202], two low-voltage electric wirings [203], and two inflators [205], according to various embodiments of the claimed technology. In the illustrative embodiments, DC voltage (such as 12 VDC) is provided by the Drone's power supply, and the positive (+) is applied to the common side of both water sensors. When either water sensor [202] detects water, it automatically and autonomously closes its switch contacts to allow voltage to activate its associated inflator, independent of all other airbag assemblies. Once activated, the inflator produces an appropriate amount of nitrogen gas, which inflates its associated airbag (not shown) within about 30 milliseconds.

Figure 12:
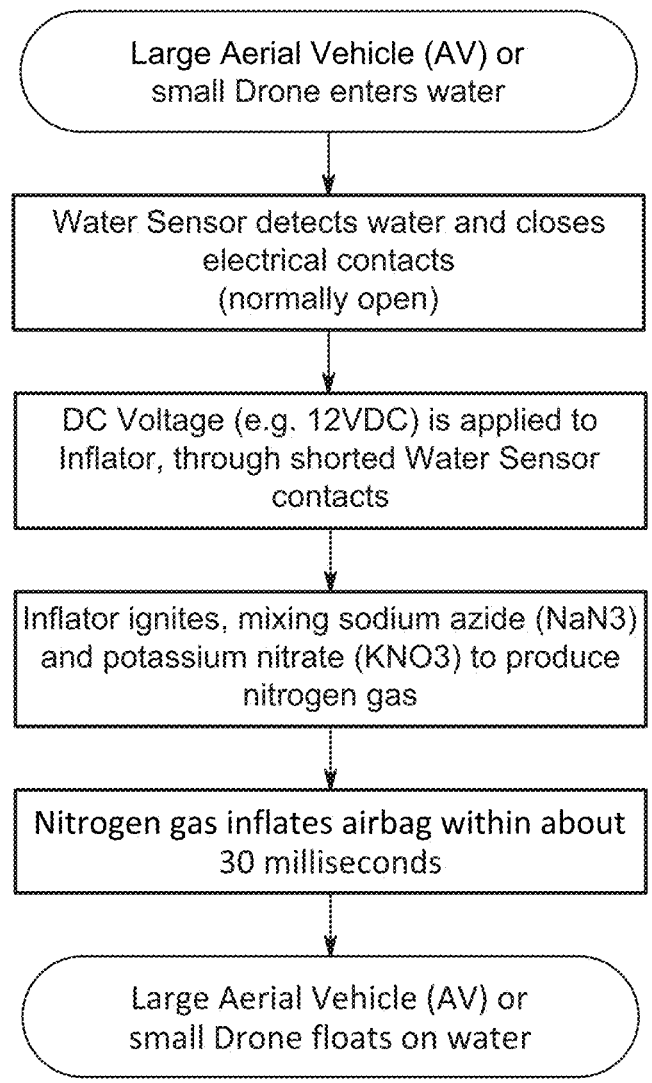
FIG. 12 is a flowchart illustrating the EFS activation process which will provide flotation for both large AVs and small Drones, according to various embodiments of the claimed technology.

FIG. 12 is a flowchart illustrating the EFS activation process, for both large AVs and small Drones, according to various embodiments of the claimed technology. The flowchart illustrates the overall activation process, specifically actions performed by a large AV or small Drone, and actions performed by the claimed EFS technology. If a large AV or small Drone enters water, water sensors detect the water and automatically and autonomously close their switch contacts to allow voltage to activate their associated inflators, independent of all other airbag assemblies. When an inflator receives DC voltage (such as 12 VDC), it activates to mix an appropriate amount of sodium azide (NaN3) and an appropriate amount of potassium nitrate (KNO3) to produce an appropriate amount of nitrogen gas. The nitrogen gas then inflates its associated airbag (not shown) within about 30 milliseconds. Once inflated, the airbags provide flotation so the AV or Drone can float on the water surface, so that passengers, cargo or payload can be rescued, and to keep the AV or Drone itself from sinking, so it can be recovered.

In illustrative large-size EFS embodiments, the large AV landing leg frame is constructed of an aluminum or titanium alloy, to provide strength, superior corrosion resistance, and light weight. In other embodiments, the large AV leg frame may be constructed of other metals/alloys, plastic or composite materials which still provide the needed strength to support the weight of the AV and maximum payload upon landing and while parked. In other embodiments, the large AV landing leg may be of a different size, shape, or design, may be combined with the section containing the electric motors into a single frame/structure, may use various connection methods, may be in a different position and/or location, and/or may be of different dimensions.

In illustrative large-size EFS embodiments, the large AV landing leg covers are constructed of composite materials which provide sufficient strength and durability to provide protection for the airbag assemblies and provide a smooth aerodynamic exterior surface that minimizes drag. The covers can be approximately ⅛th inch thick, and contain vertical perforations and horizontal perforations which create strips when the cover is torn/blown open by the force of the airbag. The strips are approximately 2 inches wide×six (6) inches long, and are perforated around three edges, leaving the edge closest to the top and bottom securely attached to the cover once the strips are torn/blown open. In other large AV embodiments, the covers may be constructed of other materials, may be perforated in a different pattern to create other sizes of strips or other shapes, may be in a different position and/or location, and/or may be of different dimensions.

In illustrative small-size EFS embodiments, the vertical and horizontal landing leg tubes are constructed of carbon fiber or aluminum, to provide strength, superior corrosion resistance, and light weight. In other embodiments, the small-size landing leg assemblies may be of a different size, shape, or design; may use various connection methods, may be in a different position and/or location, and/or may be of different dimensions.

In illustrative large-size EFS embodiments, the large AV water sensor covers are constructed of durable, lightweight materials, and are mechanically attached to the landing leg covers with hardware such as bolts, and/or adhesive. When securely attached, the covers provide a water-resistant seal to protect the water sensors from precipitation and the elements. The lower portion of the water sensor cover is open to allow water to enter and contact the water sensor, if the water rises to approximately six (6) inches above the landing surface, whether due to flooding or if the landing leg enters a body of water (such as a lake, river, ocean, flooded area, etc.). In other large AV embodiments, the water sensor covers may be constructed of other materials, may be a different shape, position or location, may be more or less aerodynamic, and/or may be of different dimensions.

In illustrative small-size EFS embodiments, the water sensor covers are constructed of durable, lightweight materials, and are mechanically attached to the vertical landing legs with adhesive. When securely attached, the covers provide a water-resistant seal to protect the water sensors from precipitation and the environmental elements. The lower portion of the water sensor cover is open to allow water to enter and contact the water sensor, if the water rises to approximately three (3) inches above the landing surface, whether due to flooding or if the landing leg enters a body of water (such as a lake, river, ocean, flooded area, etc.). In other small-size embodiments, the water sensor covers may be constructed of other materials, may be a different shape, position or location, may be more or less aerodynamic, and/or may be of different dimensions.

In illustrative large- and small-size EFS embodiments, the water sensors can be optical infrared type water sensors/switches, similar to conventional sensors such as the Neptune Systems OS-1 (https://wwww.neptunesystems.com/fmm-accessories). When water covers the exterior clear surface of the sensors, the infrared light is deflected/changed, causing the sensor to switch its contacts from open to closed (the sensor switch is normally open). When the contacts close, positive DC voltage (such as12 VDC) is shorted through the sensor and applied to its associated inflator, causing it to activate and blow out the airbag. In other embodiments, the water sensors may be a different type or shape, may be in a different position or location, or may be of different dimensions. Other embodiments may also use a different design/configuration to activate the inflators.

In illustrative large- and small-size EFS embodiments, the inflators can be similar to inflators used in automotive airbag systems (such as Delphi, TRW, Autoliv, Takata, etc.), but of a shape and size to fit within the respective landing leg assemblies. Once activated, the inflators allow an appropriate amount of sodium azide (NaN3) to react with an appropriate amount of potassium nitrate (KNO3) to produce an appropriate amount of nitrogen gas, so to inflate the associated airbag to the appropriate size required to provide the needed flotation, within about 30 milliseconds. The quantity of the individual compounds will vary based on the specific size and weight of the large-size AV or small-size Drone application. Other embodiments may use other inflators similar to those used for aircraft evacuation slide systems (such as those manufactured by EAM Worldwide, etc.), may use alternative compounds, may operate in a different manner, may be a different shape, position, location, or dimension.

In illustrative large-size EFS embodiments, the airbags are constructed of urethane materials similar to those used for aircraft evacuation slide systems used on fixed-wing passenger aircraft (such as those manufactured by EAM Worldwide, etc.). They are designed to maintain air pressure once inflated (similar to evacuation slides) rather than deflate like automotive airbags. Each airbag is protected from over inflation by a pressure relief valve. In illustrative large AV embodiments, the shape of an inflated airbag resembles a half-donut shape, and its size will support/float at least ⅙th of the AV weight at full payload. This "larger than necessary" size creates a degree of redundancy which allows an AV to float with full payload, even if only six of the eight airbag assemblies inflate, for whatever reason. In other large AV embodiments, the airbag may be constructed of other materials, may operate/inflate in a different manner, may be in a different position or location, or may be of a different shape or dimension. Further, in other large AV embodiments, the landing leg may contain more or less airbags, if the airbags are of a different shape or dimension.

In illustrative small-size EFS embodiments, the airbags are constructed of latex or synthetic rubber (neoprene) material, similar to that used for weather balloons. They are designed to maintain air pressure once inflated, rather than deflate like automotive airbags. Since the small-size airbags are made of latex or synthetic rubber, they will stretch and expand significantly more than the amount of gas produced by the inflators, and are therefore not necessarily protected by a pressure relief valve. In illustrative small-size embodiments, the shape of an inflated airbag resembles a round balloon. Each inflated airbag will be oversized, so to support/float the Drone weight at full payload if such as only 2 of 3, 3 of 4, 4 of 6, or 6 of 8 airbags inflate, for whatever reason, depending on the specific Drone configuration. This "larger than necessary" size creates a degree of redundancy which allows a Drone to float with full payload, even if only a portion of the total number of airbag assemblies inflate, for whatever reason. In other small-size embodiments, the airbag may be constructed of other materials, may operate/inflate in a different manner, may be in a different position or location, or may be of a different shape or dimension.

In illustrative large-size EFS embodiments, the pressure relief valve is integral part of each airbag. The valve is attached and sealed into the urethane material during the manufacturing process using adhesive products and processes such as heating and pressing. It is similar to a Carmo Pressure Relief Valve (https://www.carmo.dk/productsheet/gb/03-374). The lightweight, plastic valve provides relief when a predetermined pressure is reached, relieving excess pressure and keeping the airbag from bursting. The valve enables the airbag to fill to its nominal pressure, estimated to be between 3.5 and 7 bar (~50 to 100 psi), and relieves pressure when it exceeds the top predetermined threshold limit. In other large AV embodiments, the pressure relief valves may be constructed of other materials, may operate (relieve air pressure) in a different manner, may be a different shape, may be in a different position or location, or may be of different dimensions. Although in the illustrative embodiments depicted by FIGS. 8-10 and the descriptions thereof the Drone does not include a pressure relief valve, the contemplated embodiments of this technology are not so limited. In equivalent alternative embodiments the small Drone embodiments can contain a pressure relief valve as described herein.

In illustrative large- and small-size EFS embodiments, the low-voltage electrical wiring connects DC voltage (such as 12 VDC) from the AV/Drone power supply, to each airbag assembly, independent of other airbag assemblies. Positive DC voltage is wired directly to the water sensor/switch, and if water is present, completes the circuit through the closed switch contacts, is applied to its associated inflator which is then activated, and returns to negative DC. The low-voltage electrical wiring has two copper conductors, approximately 22-gauge, and is covered in flame-retardant insulation. In other embodiments, the wire may be constructed using other conductive metals or insulative materials, may be wired/connected in other configurations and/or to other components within the AV/Drone, may have larger or smaller gauge wire and/or other types of wire (such as stranded copper, solid-conductor copper, aluminum, etc.), may be in a different position and/or location, and/or may be of different dimensions.

Other large-size embodiments of the claimed EFS technology may be manufactured in different configurations on other large AVs, may be attached to or part of more or less landing legs, may be attached to or part of the AV body, frame, or other component; may be a different shape, in a different position or location, or a different size. Further, other large AV embodiments may activate the airbags using other methods.

Other small-size embodiments of the claimed EFS technology may be manufactured in different configurations on other Drones, may be attached to or part of more or less landing legs, may be attached to or part of the Drone body, frame, or other component; may be a different shape, in a different position or location, or a different size. Further, other small Drone embodiments may activate the airbags using other methods.

While illustrative materials for elements of the claimed EFS technology have been described, the claimed technology is not limited by these materials. Plastics, rubber, foam, metal alloys, aluminum, titanium, carbon fiber, carbon composites, and other materials/composites may comprise some or all of the elements of the claimed technology.

Although the claimed EFS technology is illustrated and described herein with reference to illustrative large-size and small-size embodiments and specific examples thereof, it will be readily apparent to those of ordinary skill in the art that other embodiments and examples may perform similar functions and/or achieve like results. All such equivalent embodiments and examples are within the spirit and scope of the claimed technology, are contemplated thereby, and are intended to be covered by the following claims.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed:

1. An emergency flotation system for floating a flying machine on a body of water, the system, comprising:
    a water sensor mounted to the flying machine;
    an inflation device configured to produce a desired supply of pressurized gas in response to the water sensor detecting a presence of water; and
    an inflatable flotation device in fluid communication with the inflation device to receive the pressurized gas and thereby become inflated, and configured, when inflated, to impart a buoyant force to the flying machine in the water;
    wherein the flotation device is mounted to a framework of the flying machine when it is not inflated; and
    wherein the flotation device is mounted inside a hollow tubular member of the framework.

2. The system of claim 1 wherein the flying machine comprises an Aerial Vehicle (AV).

3. The system of claim 1 comprising an environmental cover over the water sensor.

4. The system of claim 1 comprising a pressure relief valve connected to the flotation device.

5. The system of claim 1 comprising a perforated cover enclosing the flotation device when it is not inflated.

6. The system of claim 1 comprising a plurality of flotation devices.

7. The system of claim 6 wherein the flotation devices are configured so that less than all of the plurality collectively provide a buoyant force that is sufficient to prevent the flying machine and its payload from sinking in the water.

8. The system of claim 6 comprising a plurality of inflation devices corresponding to the plurality of flotation devices.

9. The system of claim 8 configured so that all of the flotation devices are inflated if any one of the inflation devices are activated.

10. The system of claim 8 configured so that each flotation device is inflated only if its corresponding inflation device is activated.

11. An emergency flotation system for floating a flying machine on a body of water, the system, comprising:
    a water sensor mounted to the flying machine;
    an inflation device configured to produce a desired supply of pressurized gas in response to the water sensor detecting a presence of water; and
    an inflatable flotation device in fluid communication with the inflation device to receive the pressurized gas and thereby become inflated, and configured, when inflated, to impart a buoyant force to the flying machine in the water;
    wherein the flotation device is mounted to a framework of the flying machine when it is not inflated; and
    wherein the flotation device, when it is not inflated, is mounted inside a landing leg of the flying machine.

12. The system of claim 11 wherein the flying machine comprises a Drone.

13. The system of claim 11 comprising an environmental cover over the water sensor.

14. The system of claim 11 comprising a pressure relief valve connected to the flotation device.

15. The system of claim 11 comprising a perforated cover enclosing the flotation device when it is not inflated.

16. The system of claim 11 comprising a plurality of flotation devices.

17. The system of claim 16 wherein the flotation devices are configured so that less than all of the plurality collectively provide a buoyant force that is sufficient to prevent the flying machine and its payload from sinking in the water.

18. The system of claim 16 comprising a plurality of inflation devices corresponding to the plurality of flotation devices.

19. The system of claim 18 configured so that all of the flotation devices are inflated if any one of the inflation devices are activated.

20. The system of claim 18 configured so that each flotation device is inflated only if its corresponding inflation device is activated.

* * * * *